United States Patent Office 3,636,144
Patented Jan. 18, 1972

3,636,144
DITHIOPHOSPHORIC ACID SALTS AND PROCESS FOR MAKING SAME
Hiroshi Tsuchiya, Ashiya-shi, Fukashi Horiuchi, Takatsuki-shi, Kunio Mukai, Nishinomiya-shi, Akio Kimura, Takarazuka-shi, and Yoshihiko Nishizawa, Nara-shi, Japan, assignors to Sumitomo Chemical Company, Ltd., Osaka, Japan
No Drawing. Filed Apr. 3, 1968, Ser. No. 718,327
Claims priority, application Japan, Apr. 6, 1967, 42/22,234
Int. Cl. C07f 9/16
U.S. Cl. 260—958                7 Claims

ABSTRACT OF THE DISCLOSURE

Dithiophosphoric acid salts such as sodium O-ethyl-S-benzylphosphorodithioate, potassium O-n-propyl-S-benzylphosphorodithioate, sodium O-n-butyl-S-ethylphosphorodithioate and potassium O-ethyl-S-1-(2-phenylpropyl)phosphorodithioate are produced by reacting a thiolthionophosphoric acid ester with sodium hydrosulfide or potassium hydrosulfide in an absolute or aqueous organic solvent at 50° to 150° C. for 30 minutes to 5 hours. The thus produced dithiophosphoric acid salts are useful as intermediates for manufacturing dithiolester type organic phosphorus agricultural chemicals and further they include dithiophosphoric acid salts.

---

The present invention relates to novel dithiophosphoric acid salts, and method for producing the same.

As regards the method for the production of dithiophosphoric acid salts, there have been heretofore reported several processes. Representatives of these processes are, for example, illustrated as follows:

(1) A process which comprises reacting a thiolthionophosphoric acid ester with a sodium mercaptide to obtain the desired dithiophosphoric acid salts as shown, for example, by the following reaction formula, $$\begin{matrix} C_2H_5O \\ \phantom{xx} \diagdown \\ \phantom{xxxx} P-S-C_2H_5 + NaSC_2H_5 \longrightarrow \\ \phantom{xx} \diagup \\ C_2H_5O \end{matrix}$$

$$\begin{pmatrix} C_2H_5O & O \\ & \diagdown \diagup \\ & P \\ & \diagup \diagdown \\ C_2H_5S & S \end{pmatrix} Na + C_2H_5SC_2H_5$$

(see German Pat. No. 1,100,019), (2) A process which comprises reacting a thiolthionophosphoric acid ester with potassium xanthogenate to obtain the desired potassium phosphorodithioate as shown by the following reaction formula, $$\begin{matrix} CH_3O \\ \phantom{xx} \diagdown \\ \phantom{xxxx} P-S-CH_3 + KS \cdot CS \cdot OC_2H_5 \longrightarrow \\ \phantom{xx} \diagup \\ CH_3O \end{matrix}$$

$$\begin{pmatrix} CH_3O & O \\ & \diagdown \diagup \\ & P \\ & \diagup \diagdown \\ CH_3O & S \end{pmatrix} K + CH_3S-\underset{\underset{S}{\|}}{C}-OC_2H_5$$

(see German Pat. No. 1,141,634), and (3) A process which comprises reacting a thiolthionophosphoric acid ester with potassium O,O-dialkylphosphorodithioate to obtain the desired dithiophosphoric acid salt, as shown, for example, by the following formula $$(Alk-O-)_2\underset{\underset{S}{\|}}{P}-S-Alk' + KS-\underset{\underset{S}{\|}}{P}(O-Alk'')_2 \longrightarrow$$

$$\begin{pmatrix} Alk-O & O \\ & \diagdown \diagup \\ & P \\ & \diagup \diagdown \\ Alk'-S & S \end{pmatrix} K + Alk-S-\underset{\underset{S}{\|}}{P}(O-Alk'')_2$$

wherein Alk—, Alk'— and Alk" represent same or different alkyl groups.

(See Belgian Pat. No. 600,635.)

In these known processes, however, there were disadvantages as shown below, that is, (1) an expensive starting material such as sodium mercaptide was used as in a process of German Pat. No. 1,100,019, (2) procedures for production were complicated in point of views of using potassium xanthogenate and of aftertreatment for separating the desired dithiophosphoric acid salt from the reaction mixture containing the desired product and the ester of xanthogenic acid as in a process of German Pat. No. 1,141,634, (3) an expensive starting material such as potassium O,O-dialkylphosphorodithioate was used, and (4) there were dithiophosphoric acid salts which were difficult to obtain by these known processes.

Extensive studies by the present inventors have resulted in the present invention, wherein a process which is different from the conventional methods and which may be carried out in an economical and very simple manner to give dithiophosphoric acid salts desired in a high yield has been found.

Dithiophosphoric acid salts obtained in accordance with the process of the present invention are indispensable intermediates for economically manufacturing organic phosphorus dithiolester type compounds using, for example, as agricultural chemicals.

One object of the present invention is to provide novel process for producing dithiophosphoric acid salts.

Another object of the present invention is to provide novel dithiophosphoric acid salts.

Other objects of the present invention will be apparent from the following description.

In order to accomplish these objects, the present invention provides a process for producing dithiophosphoric acid salts represented by the formula, $$\begin{pmatrix} RO & O \\ & \diagdown \diagup \\ & P \\ & \diagup \diagdown \\ AS & S \end{pmatrix} M \qquad (I)$$

wherein R represents an alkyl group having up to 5 carbon atoms, A represents an alkyl group having up to 10 carbon atoms, a cycloalkyl group having up to 6 carbon atoms, an unsubstituted or an alkyl- or halogen-substituted phenyl group, an unsubstituted or an alkyl-, nitro- or halogen-substituted phenylalkyl group, an alkoxyalkyl group having up to 6 carbon atoms, a phenoxyalkyl group having up to 9 carbon atoms, and alkylthioalkyl group up to 6 carbon atoms, or a phenylthioalkyl group having up to 9 carbon atoms; and M represents sodium or potassium atom, which comprises reacting a thiolthionophosphoric acid ester represented by the formula, $$\underset{\underset{S}{\|}}{(RO)_2-P-S-A} \qquad (II)$$

wherein R and A have the same meanings as defined in the Formula I, with an alkali metal hydrosulfide represented by the formula, $$M \cdot SH \qquad (III)$$

wherein M has the same meanings as defined in the Formula I, to obtain the dithiophosphoric acid salt of the Formula I.

Further, the present invention provides novel dithiophosphoric acid salts represented by the formula, $$\begin{pmatrix} RO & O \\ & \diagdown \diagup \\ & P \\ & \diagup \diagdown \\ A'S & S \end{pmatrix} M \qquad (I')$$

wherein R and M have the same meanings as defined in the Formula I, and A' represents an alkyl group having up to 10 carbon atoms and being different from the alkyl group of R, a cycloalkyl group having up to 6 carbon atoms, an unsubstituted or an alkyl- or halogen substituted phenyl group, an unsubstituted or an alkyl-, nitro- or halogen-substituted phenylalkyl group, an alkoxyalkyl group having up to 6 carbon atoms, a phenoxyalkyl group having up to 9 carbon atoms, an alkylthioalkyl group up to 6 carbon atoms or a phenylthioalkyl group having up to 9 carbon atoms.

As an alkali metal hydrosulfide used in the process of the present invention, a crystalline alkali metal hydrosulfide or one obtained by reacting a corresponding alkali metal hydroxide or a corresponding alkali metal alcoholate with hydrogen sulfide in a solvent is used, and those containing water of crystallization may also be used.

Thiolthionophosphoric acid esters used in the present process are known compounds or may be produced by a conventional method. The alkali methal hydrosulfide is used in a stoichiometric or more amount, and preferably in an amount of 1 to 1.2 moles per mole of the thiolthionophosphoric acid ester.

In practicing the process of the present invention an absolute or aqueous organic solvent is used as a reaction medium. Examples of the organic solvent are alcohol having up to five carbon atoms such as methanol, ethanol, propanol, n-butanol and n-amyl alcohol, 2-alkoxyethanol such as 2-methoxyethanol and 2-ethoxyethanol, dimethyl sulfoxide, dimethylformamide and a mixture thereof. In case aqueous organic solvent is used, the amount of water is below 50% by weight, and it is preferable to remove water from the reaction mixture during the reaction. The amount of the solvent is dependent on the thiolthionophosphoric acid ester or alkali metal sulfide employed as starting materials and solvent itself it is preferably 0.5 to 2 times by weight based on the weight of the thiolthionophosphoric acid ester.

In carrying out the process of the present invention, an alkali metal hydrosulfide is added to a mixture containing a solvent and a thiolthionophosphoric acid ester or a thiolthionophosphoric acid ester is added to a mixture containing a solvent and an alkali metal hydrosulfide. In case an alkali metal sulfied is prepared by reacting an alkali metal hydroxide or an alkali metal alcoholate with hydrogen sulfide in a present reaction medium, it must be avoided to mix a thiolthionophosphoric acid ester and said alkali metal hydroxide or alkali metal alcoholate remaining in the medium, because the thiolthionophosphoric acid ester is hydrolyzed in the presence of said alkali metal hydroxide or alkali metal alcoholate.

In the process of the present invention, the reaction mixture is heated with stirring and generally the reaction temperature is suitably in the range of from 50° to about 150° C., and the reaction time is preferably in the range of from 30 minutes to about 5 hours, though such reaction conditions vary depending on the reaction medium and the kind of a starting material, i.e. alkali metal hydrosulfide and of the another starting material, i.e. thiolthionophosphoric acid ester.

In the process of the present invention, as a result of the reaction, a dithiophosphoric acid salt of the Formula I and a mercaptan having the formula,

RSH wherein R has the same meanings as defined above, are produced. The mercaptan may be removed from the reaction mixture during or after the reaction by, for example, distilling off.

After completion of the reaction, the solvent, and by-produced mercaptan or water are removed under reduced pressure to obtain a crude product of desired dithiophosphoric acid salt as crystal. Yield of the present reaction is very good, for example 90% or more. The thus obtained crude product as such is a product of high purity, however, it is also possible to subject it further to purification, if desired, as described in the examples.

If the thus obtained dithiophosphoric acid salt is used for a reaction of the dithiophosphoric acid salt with an active halogenated organic compound such as, for example, benzyl chloride or an alkyl halide to produce a dithiophosphoric acid ester useful as agricultural chemical, it is not necessary to separate the dithiophosphoric acid salt from the reaction mixture and purify it, and the reaction mixture containing the dithiophosphoric acid salt is employed for the next reaction as such.

Listed below are examples of thiolthionophosphoric acid esters used as a starting material in the present invention, but it should be understood that the invention is not limited to these examples only.

O,O-dimethyl-S-methyl-thiolthionophosphorate
O,O-dimethyl-S-ethyl-thiolthionophosphorate
O,O-dimethyl-S-iso-propyl-thiolthionophosphorate
O,O-dimethyl-S-n-propyl-thiolthionophosphorate
O,O-dimethyl-S-n-butyl-thiolthionophosphorate
O,O-dimethyl-S-sec-butyl-thiolthionophosphorate
O,O-dimethyl-S-benzyl-thiolthionophosphorate
O,O-diethyl-S-methyl-thiolthionophosphorate
O,O-diethyl-S-ethyl-thiolthionophosphorate
O,O-diethyl-S-n-propyl-thiolthionophosphorate
O,O-diethyl-S-n-butyl-thiolthionophosphorate
O,O-diethyl-S-sec-butyl-thiolthionophosphorate
O,O-diethyl-S-iso-butyl-thiolthionophosphorate
O,O-diethyl-S-n-amyl-thiolthionophosphorate
O,O-diethyl-S-n-decyl-thiolthionophosphorate
O,O-diethyl-S-benzyl-thiolthionophosphorate
O,O-diethyl-S-o-methylbenzyl-thiolthionophosphorate
O,O-diethyl-S-p-methylbenzyl-thiolthionophosphorate
O,O-diethyl-S-p-chlorobenzyl-thiolthionophosphorate
O,O-diethyl-S-p-nitrobenzyl-thiolthionophosphorate
O,O-diethyl-S-phenyl-thiolthionophosphorate
O,O-diethyl-S-4-chlorophenyl-thiolthionophosphorate
O,O-diethyl-S-1-phenylethyl-thiolthionophosphorate
O,O-diethyl-S-2-phenylethyl-thiolthionophosphorate
O,O-diethyl-S-2-(2-phenylpropyl)-thiolthionophosphorate
O,O,-diethyl-S-3-phenylpropyl-thiolthionophosphorate
O,O-diethyl-S-2-phenoxyethyl-thiolthionophosphorate
O,O-diethyl-S-2-ethoxyethyl-thiolthionophosphorate
O,O-diethyl-S-ethylthiomethyl-thiolthionophosphorate
O,O-diethyl-S-2-ethylthioethyl-thiolthionophosphorate
O,O-di-n-propyl-S-methyl-thiolthionophosphorate
O,O-di-n-propyl-S-ethyl-thiolthionophosphorate
O,O-di-n-propyl-S-n-propyl-thiolthionophosphorate
O,O-di-n-propyl-S-sec-butyl-thiolthionophosphorate
O,O-di-n-propyl-S-n-butyl-thiolthionophosphorate
O,O-di-n-propyl-S-phenyl-thiolthionophosphorate
O,O-di-n-propyl-S-benzyl-thiolthionophosphorate
O,O-di-n-propyl-S-n-octyl-thiolthionophosphorate
O,O-di-n-butyl-S-methyl-thiolthionophosphorate
O,O-di-n-butyl-S-ethyl-thiolthionophosphorate
O,O-di-n-butyl-S-iso-propyl-thiolthionophosphorate
O,O-di-n-butyl-S-n-butyl-thiolthionophosphorate
O,O-di-n-butyl-S-iso-butyl-thiolthionophosphorate
O,O-di-n-butyl-S-cyclohexyl-thiolthionophosphorate
O,O-di-n-butyl-S-2-phenylethyl-thiolthionophosphorate
O,O-di-n-butyl-S-benzyl-thiolthionophosphorate
O,O-di-n-butyl-S-phenyl-thiolthionophosphorate
O,O-di-n-butyl-S-4-methylphenyl-thiolthionophosphorate
O,O-di-n-amyl-S-methyl-thiolthionophosphorate
O,O-di-n-amyl-S-ethyl-thiolthionophosphorate
O,O-di-n-amyl-S-benzyl-thiolthionophosphorate
O,O-di-n-amyl-S-cyclohexyl-thiolthionophosphorate According to the present invention, dithiophosphoric acid salts can be produced in a good yield and in a high purity more economically than known processes because of using an alkali metal sulfide lower-priced than a mercaptide, or potassium phosphorodithioate, potassium xanthogenate used in the known process. Further they can be produced very readily because the present process does not require any complicated operation. Furthermore it is possible by employing the process of the present invention to produce novel dithiophosphoric acid salts of the Formula I' as mentioned above. These are advantages of the present invention.

The process of the present invention is further explained in detail with reference to the following examples. However it is not necessary to say that the present invention is not limited to them only.

EXAMPLE 1

In 50 ml. of 99.5% ethanol, was dissolved 4.0 g. (calculated as pure NaOH) of sodium hydroxide and the resulting solution was saturated with hydrogen sulfide gas at room temperature. The alcohol solution was charged with 27.6 g. of O,O-diethyl-S-benzylphosphorodithioate with stirring and was then refluxed for 3 hours. After perfectly distilling off the side-produced mercaptan, water and solvent under reduced pressure, white crystals of sodium O-ethyl-S-benzylphosphorodithioate was obtained quantitatively. The thus obtained crystals as such were highly pure products, however, these crystals were further purified by the following process to obtain a refined product. That is, the crude product was dissolved in acetone and then a small amount of insoluble matters were filtered off. After distilling off the acetone under reduced pressure, the remained crystals were dissolved in water and washed with ether. The resulting water layer was treated under reduced pressure to remove perfectly water, thereby to obtain a white refined product. Melting point of the refined product was 180°–181° C.

EXAMPLE 2

The similar procedure as in Example 1 was conducted by using 50 ml. of 99.5% ethanol, 5.6 g. (calculated as pure KOH) of potassium hydroxide, hydrogen sulfide and 30.4 g. of O,O-di-n-propyl-S-benzylphosphorodithioate to obtain white crystals of potassium O-n-propyl-S-benzylphosphorothioate. A part of the thus obtained crystals was purified by the similar procedures as in Example 1. The melting point of the refined product thereby obtained was 169°–171°C.

EXAMPLE 3

The similar procedure as in Example 1 was conducted by using 80 ml. of n-butanol, 5.6 g. of potassium hydroxide (calculated as pure KOH), hydrogen sulfide and 33.2 g. of O,O-di-n-butyl-S-benzylphosphorodithioate to obtain pale yellow crystals of potassium O-n-butyl-S-benzylphosphorodithioate in a substantially quantitative amount. The refined product obtained by purifying said crystals according to the similar procedures as in Example 1 was in the form of white crystal having melting point 175°–176° C.

EXAMPLE 4

A mixture containing 50 ml. of 95% alcohol, 5.6 g. (calculated as pure NaSH) of sodium hydrosulfide and 26.8 g. of O,O-diethyl-S-cyclohexylphosphorodithioate was gradually heated and refluxed for 3 hours with stirring. Subsequently, ethylmercaptan, water and ethanol were completely removed to obtain quantitatively white crystals of sodium O-ethyl-S-cyclohexylphosphorodithioate. The crude product thus obtained has a purity of 94% and contained a small amount of inorganic matter and 3.7% of the starting material, i.e. O,O-diethyl-S-cyclohexylphosphorodithioate.

EXAMPLE 5

The similar procedure as in Example 4 was conducted by using 50 ml. of 95% ethanol, 7.2 g. (calculated as pure KSH) of potassium hydrosulfide and 34.6 g. of O,O-diethyl-S-2-phenylethylphosphorodithioate to obtain quantitatively white crystals of potassium O-ethyl-S-2-phenylethylphosphorodithioate. The refined product obtained by purifying said crystals according to the similar process as in Example 1 had the melting point of 156°–158° C.

EXAMPLE 6

A mixture of 50 ml. of 99.5% ethanol, 7.2 g. (calculated as pure KSH) of potassium hydrosulfide and 36.0 g. of O,O-diethyl-S-1-(2-phenylpropyl)phosphorodithioate was refluxed for 5 hours. Mercaptan, ethanol and water were completely removed under reduced pressure. The remained white crystals were dissolved in acetone and a small amount of insoluble matter was removed by filtration.

The acetone was removed under reduced pressure and ether was charged into the residue, the crystals were filtered after thorough rinsing to obtain white crystals of potassium O-ethyl-S-1-(2-phenylpropyl)phosphorodithioate in a yield of 85%. The thus obtained crystals were saliently high in deliquescence.

EXAMPLE 7

The similar procedure as in Example 1 was conducted by using 50 ml. of 95% ethanol, 5.6 g. (calculated as pure KOH) of potassium hydroxide and 24.2 g. of O,O-diethyl-S-n-butylphosphorodithioate to obtain white crystals of potassium O-ethyl-S-n-butylphosphorodithioate in a substantially quantitative amount. The refined product obtained by purifying said crystals according to the similar process in Example 1 had the melting point 168°–170° C.

EXAMPLE 8

The similar procedure as in Example 4 was conducted by using 50 ml. of 95% ethanol, 4.0 g. (calculated as pure NaSH) of sodium hydrosulfide and 26.2 g. of O,O-diethyl-S-phenylphosphorodithioate to obtain quantitatively white crystals of sodium O-ethyl-S-phenylphosphorodithioate.

EXAMPLE 9

The similar procedure as in Example 4 was conducted by using 50 ml. of 95% ethanol, 7.2 g. (calculated as pure KSH) of potassium hydrosulfide and 27.4 g. of O,O-diethyl-S-ethylthioethylphosphorodithioate to obtain white crystals of potassium O-ethyl-S-ethylthioethylphosphorodithioate. The crystals were purified by the similar procedure as in Example 1 to obtain a refined product in a yield of 89%. The melting point of the refined product was 145°–146° C.

EXAMPLE 10

The similar procedure as in Example 6 was conducted by using 50 ml. of 95% ethanol, 7.2 g. (calculated as pure KSH) of potassium hydrosulfide and 34.6 g. of O,O-diethyl-S-1-phenylethylphosphorodithioate to obtain of white crystals of potassium O-ethyl-S-1-phenylethylphosphorothioate in a yield of 91%. The melting point of the thus obtained product was 143°–145° C.

EXAMPLE 11

In 40 ml. of 2-methoxyethanol was dissolved 5.7 g. of sodium methylate and the resulting mixture was saturated with dry hydrogen sulfide gas to obtain a solution of sodium hydrosulfide. To the solution was added 27.0 g. of O,O-di-n-butyl-S-ethylphosphorodithioate and the resultant mixture was heated at 125° C. for 2 hours with stirring. During the heating, methanol and butyl mercaptan were removed from the reaction mixture. After completion of the reaction the reaction mixture was filtered, and the obtained filtrate was concentrated under reduced pressure to give 23.5 g. of white crystals of sodium O-n-butyl-S-ethylphosphorodithioate. The crude sodium O-n-butyl-S-ethylphosphorodithioate thus obtained had 95% of purity as such.

EXAMPLE 12

In 50 ml. of 2-ethoxyethanol was dissolved 5.7 g. of sodium methylate. The resultant mixture was saturated with dry hydrogen sulfide gas to obtain a solution of sodium hydrosulfide. To the solution, was added 21.4 g. of O,O-diethyl-S-ethylphosphorodithioate and the resultant mixture was heated at 100° C. for 1.5 hours with stirring. During the heating, boiling methanol and ethyl mercaptan were removed from the reaction mixture, and then similar procedure as in Example 11 was conducted to obtain 20.5 g. of white crystals of sodium O-ethyl-S-ethylphosphorodithioate.

EXAMPLE 13

In 50 ml. of 2-methoxyethanol was dissolved 5.7 g. of sodium methylate, and the resultant mixture was saturated with dry hydrogen sulfide gas while the mixture was heated at 100° to 115° C. and methanol was removed to obtain a solution of sodium hydrosulfide. After completion of saturating hydrogen sulfide, to the resultant solution was added dropwise 33.2 g. of O,O-di-n-butyl-S-benzyl-phosphorodithioate during 30 minutes with stirring, while heating at 115° to 125° C. and removing by-produced butyl mercaptan. After completion of addition of O,O-di-n-butyl-S-benzylphosphorodithioate, heating the reaction mixture was continued at 125° C. for 2 hours with stirring to complete the reaction. Subsequently similar procedure as in Example 11 was conducted to give 29.8 g. of white crystals of sodium O-n-butyl-S-benzylphosphorodithioate.

EXAMPLE 14

In 50 ml. of absolute ethanol was dissolved 7.1 g. of sodium ethylate, and the resultant solution was saturated with dry hydrogen sulfide gas to obtain a solution of sodium hydrosulfide. After completion of saturating hydrogen sulfide, to the resultant solution was added 20.0 g. of O,O-diethyl-S-methylphosphorodithioate under reflux over the period of 30 minutes with stirring, and subsequently reflux was continued for additional 3 hours. After cooling, a small amount of insoluble matter was filtered off to obtain an ethanolic solution containing sodium O-ethyl-S-methylphosphorodithioate. The resultant ethanolic solution was concentrated under reduced pressure to obtain pale yellow crystals of sodium O-ethyl-S-methylphosphorodithioate having 94.3% purity (yield 98%).

EXAMPLE 15

A similar procedure as in Example 14 was conducted by using 50 ml. of 95% ethanol, 4.0 g. (calculated as 100% purity) of sodium hydroxide and 22.8 g. of O,O-diethyl-S-n-propylphosphorodithioate to obtain pale yellow crystals of sodium O-ethyl-S-n-propylphosphorodithioate of 91.0% purity (yield 98%).

EXAMPLE 16

A solution of sodium hydrosulfide was prepared by using 50 ml. of n-propanol and 5.7 g. of sodium ethylate and hydrogen sulfide. To this solution 24.2 g. of O,O-di-n-propyl-S-ethylphosphorodithioate was added dropwise at 97° to 98° C. during 30 minutes with stirring. After completion of the addition, heating the reaction mixture at the same temperature was continued for additional 3 hours. During the reaction, produced methanol and n-propyl mercaptan were removed from the reaction mixture. Subsequently a similar procedure as in Example 14 was conducted to obtain pale yellow crystals of sodium O-n-propyl-S-ethylphosphorodithioate having 97.5% purity (yield 100%).

EXAMPLE 17

A solution of sodium hydrosulfide was prepared by using 50 ml. of dimethyl sulfoxide, 5.7 g. of sodium methylate and hydrogen sulfide. To this solution 28.4 g. of O,O-di-n-butyl-S-n-propylphosphorodithioate was added and the resultant reaction mixture was heated at 125° C. for 2 hours to complete the reaction. During the reaction, produced methanol and n-butyl mercaptan were removed from the reaction mixture. After cooling, the reaction mixture was filtered and the filtrate was concentrated under reduced pressure to obtain yellow crystals of sodium O-n-butyl-S-n-propylphosphorodithioate having 98.5% purity (yield 100%).

EXAMPLE 18

A solution of sodium hydrosulfide was prepared by using 50 ml. of ethoxyethanol, 5.7 g. of sodium methylate and hydrogen sulfide. To this solution 29.8 g. of O,O-di-n-amyl-S-ethylphosphorodithioate was added and the resultant reaction mixture was heated at 135° C. for 2 hours with stirring to complete the reaction. During the reaction, produced n-amyl mercaptan was removed from the reaction mixture. Subsequently a similar procedure as in Example 17 was conducted to obtain pale yellow crystals of sodium O-n-amyl-S-ethylphosphorodithioate having 96.3% purity (yield 99%).

We claim:

1. Dithiophosphoric acid salts represented by the formula,

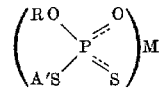

wherein R represents an alkyl group having up to 5 carbon atoms; A' represents cyclohexyl group, an alkoxyalkyl group having up to 6 carbon atoms, a phenoxyalkyl group having up to 9 carbon atoms, a phenylthioalkyl group having up to 9 carbon atoms; phenylethyl group or phenylpropyl group; and M represents sodium or potassium atom.

2. A compound according to claim 1, wherein A' is a cyclohexyl.

3. A compound according to claim 1, wherein A' is phenylethyl.

4. A compound according to claim 1, wherein R is ethyl.

5. A process for producing dithiophosphoric acid salts represented by the formula,

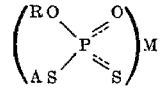  (I)

wherein R represents an alkyl group having up to 5 carbon atoms, A represents an alkyl group having up to 10 carbon atoms, cyclohexyl group, an unsubstituted or lower alkyl or chlorine-substituted phenyl group, an unsubstituted or a lower alkyl, nitro- or chlorine-substituted phenyl-lower alkyl group, an alkoxyalkyl group having up to 6 carbon atoms, a phenoxyalkyl group having up to 9 carbon atoms, an alkylthioalkyl group up to 6 carbon atoms or a phenylthioalkyl group having up to 9 carbon atoms; and M represents sodium or potassium atom, which comprises reacting a thiolthionophosphoric acid ester represented by the formula,

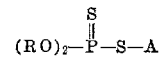  (II)

wherein R and A have the same meanings as defined in the Formula I, with an alkali metal hydrosulfide represented by the formula,

  (III)

wherein M has the same meanings as defined in the Formula I, at a temperature of 50° to 150° C. in a liquid reaction medium.

6. A process according to claim 5, wherein the liquid reaction medium is an organic solvent selected from the group consisting of an alcohol having up to five carbon atoms, 2 lower alkoxyethanol, dimethyl sulfoxide, dimethylformamide and mixtures thereof, or a mixture of said organic solvent and water, the amount of water being below 50% by weight.

7. A process according to claim 5 wherein the dithiophosphoric acid salts are sodium O-n-butyl-S-ethylphosphorothioate, sodium O-n-butyl-S-benzylphosphorothioate or sodium O-ethyl-S-methylphosphorothioate.

References Cited

UNITED STATES PATENTS

| | | | |
|---|---|---|---|
| 3,309,371 | 3/1967 | Curry et al. | 260—949 X |
| 3,092,649 | 6/1963 | Schrader | 260—987 X |

OTHER REFERENCES

Remy, "Treatise on Inorganic Chemistry," Elsevier Pub. Co., New York (1956), p. 734.

CHARLES B. PARKER, Primary Examiner

A. H. SUTTO, Assistant Examiner

U.S. Cl. X.R.

260—948, 949, 950, 951, 954, 963, 968, 978, 987